United States Patent [19]

Briscoe

[11] 4,336,145

[45] Jun. 22, 1982

[54] LIQUID GEL CONCENTRATES AND METHODS OF USING THE SAME

[75] Inventor: James E. Briscoe, Duncan, Okla.

[73] Assignee: Halliburton Company, Duncan, Okla.

[21] Appl. No.: 57,099

[22] Filed: Jul. 12, 1979

[51] Int. Cl.$^3$ .............................................. E21B 43/26
[52] U.S. Cl. ............................. 252/8.55 R; 149/108.8; 252/8.55 C; 252/314; 524/45; 524/46; 524/55
[58] Field of Search ..................... 252/8.55 R, 8.55 C, 252/8.5 C, 8.5 A, 314, 363.5

[56] References Cited

U.S. PATENT DOCUMENTS

| | | | |
|---|---|---|---|
| 3,243,000 | 3/1966 | Patton et al. | 252/8.5 X |
| 3,554,287 | 1/1971 | Eilers et al. | 252/8.55 X |
| 3,615,794 | 10/1971 | Nimerick | 252/8.55 X |
| 3,882,029 | 5/1975 | Fischer et al. | 252/8.55 |
| 3,898,165 | 8/1975 | Ely et al. | 252/8.55 |
| 3,900,406 | 8/1975 | Clampitt et al. | 252/8.55 |
| 3,960,736 | 6/1976 | Free et al. | 252/8.55 |
| 4,021,355 | 5/1977 | Holtmyer et al. | 166/283 X |
| 4,068,720 | 1/1978 | Hessert et al. | 252/8.55 X |

*Primary Examiner*—Herbert B. Guynn
*Attorney, Agent, or Firm*—John H. Tregoning; Thomas R. Weaver

[57] ABSTRACT

A liquid gel concentrate for forming a high viscosity treating fluid is provided which can be premixed and stored before being used. The concentrate is comprised of water, a hydratable polymer which yields viscosity upon hydration and an inhibitor having the property of reversibly reacting with the hydratable polymer in a manner whereby the rate of hydration of the polymer is retarded. Upon the selective reversal of the hydration inhibiting reaction the polymer is hydrated and high viscosity yielded thereby. The concentrate can be utilized directly or it can be diluted with additional water to form a large volume of high viscosity treating fluid.

25 Claims, No Drawings

LIQUID GEL CONCENTRATES AND METHODS OF USING THE SAME

Many treatments and procedures are carried out in industry utilizing high viscosity fluids to accomplish a number of purposes. For example, in the oil industry, high viscosity aqueous well treating fluids are utilized in treatments to increase the recovery of hydrocarbons from subterranean formations such as by creating fractures in the formations, acidizing the formations, etc. High viscosity aqueous fluids are also commonly utilized in well completion procedures. For example, during the completion of a well, a high viscosity aqueous completion fluid having a high density is introduced into the well to maintain hydrostatic pressure on the formation which is higher than the pressure exerted by fluids contained in the formation thereby preventing the formation fluids from flowing into the wellbore.

Heretofore, in preparing high viscosity treating fluids it has been necessary to utilize a number of dry additives which are mixed with water or other aqueous fluid at the job site. A number of disadvantages are inherent in such mixing procedures, particularly when large volumes of treating fluids are prepared. For example, special mixing equipment for mixing the dry additives with water is required and problems such as chemical dusting, uneven mixing, lumping of gels while mixing and extended preparation and mixing time are involved. In addition, the mixing and physical handling of large quantitites of dry chemicals require a great deal of manpower, and where continuous mixing is required, the accurate and efficient handling of chemicals such as salts, gelling agents, gel breakers, fluid loss control additives, complexers and surfactants is extremely difficult.

By the present invention an aqueous liquid concentrate of gelling agents (hydratable polymers or copolymers which yield viscosity upon hydration), salts and other additives is provided. The concentrate is inhibited from yielding viscosity, i.e., the hydration rate of the gelling agent or agents is retarded in a manner whereby the concentrate can be premixed and stored either at the job site or at locations away from the job site. When the concentrate is combined with additional water, either in a batch mixing procedure or a continuous mixing procedure in a proper ratio and under proper pH and/or temperature conditions, the inhibition of the hydration of the gelling agent or agents contained in the concentrate is reversed and a high viscosity aqueous fluid is produced. The concentrate can also be utilized directly, i.e., to produce a high viscosity fluid without the addition of water, and in such use the inhibition of the hydration of the gelling agent or agents in the concentrate is reversed by changing the pH or temperature of the concentrate. In some instances, either when the concentrate is used directly or diluted with additional water, the inhibition of the hydration of the gelling agent or agents therein is reversed by combining a chemical with the concentrate which reacts therewith to reverse or supplement the reversal of the inhibition. Thus, the liquid gel concentrate of the present invention and the use thereof for the preparation of high viscosity fluids substantially reduces the manpower and equipment which has been heretofore required and obviates the problems and disadvantages mentioned above.

The liquid gel concentrate of the present invention is comprised of water, a hydratable polymer or mixture of polymers which yield viscosity upon hydration and an inhibitor having the property of reversibly reacting with the hydratable polymer or polymers in a manner whereby the rate of hydration of the polymer is retarded. Upon a change in the pH condition of the concentrate such as by dilution and/or the addition of pH changing chemicals to the concentrate, upon increasing the temperature of the concentrate, or upon the change of other selected condition of the concentrate the inhibition reaction is reversed and the polymer or polymers hydrate to yield viscosity.

Hydratable polymers which are suitable for use in accordance with the present invention include polymers which contain, in sufficient concentration and reactive position, one or more of the functional groups hydroxyl, cis-hydroxyl, carboxyl, sulfate, sulfonate, amino or amide. Particularly suitable such polymers are polysaccharides and derivatives thereof which contain one or more of the following monosaccharide units: galactose, mannose, glucoside, glucose, xylose, arabinose, fructose, glucuronic acid or pyranosyl sulfate. Natural hydratable polymers containing the foregoing functional groups and units include guar gum and derivatives thereof, locust bean gum, tara, konjak, tamarind, starch, cellulose and derivatives thereof, karaya, xanthan, tragacanth and carrageenan.

Hydratable synthetic polymers and copolymers which contain the above-mentioned functional groups and which can be utilized in accordance with the present invention include, but are not limited to, polyacrylate, polymethacrylate, polyacrylamide, maleic anhydride methylvinyl ether copolymers, polyvinyl alcohol, and polyvinylpyrrolidone.

The following table sets forth the specific functional groups and structural monosaccharide units contained in the polymers mentioned above.

| Polymer | Monosaccharide Units | Functional Groups |
|---|---|---|
| Guar Gum and Derivatives thereof | Galactose and Mannose | Hydroxyl and cis-hydroxyl |
| Locust Bean Gum | Galactose and Mannose | Hydroxyl and cis-hydroxyl |
| Tara | Galactose and Mannose | Hydroxyl and cis-hydroxyl |
| Konjak | Glucose and Mannose | Hydroxyl and cis-hydroxyl |
| Tamarind | Galactose, Xylose and Glucose | Hydroxyl |
| Starch | Glucose | Hydroxyl |
| Cellulose | Glucose | Hydroxyl |
| Starch derivative | Glucose | Hydroxyl, sulfate, sulfonate and carboxyl |
| Cellulose derivative | Glucose | Hydroxyl, sulfate, sulfonate and carboxyl |
| Karaya | Galactose | Hydroxyl and carboxyl |
| Xanthan | Glucose and Mannose | Hydroxyl, carboxyl and cis-hydroxyl |
| Tragacanth | Galactose, Xylose, Arabinose, Fructose and Glucuronic Acid | Hydroxyl, carboxyl and cis-hydroxyl |
| Carrageenan | Galactose and Pyranosyl Sulfate | Hydroxyl and sulfate |
| Polyacrylamide | — | Amide, carboxyl, amino and sulfate |
| Polyacrylate | — | Carboxyl |
| Maleic anhydride methylvinyl ether copolymers | — | Carboxyl |
| Polyvinyl alcohol | — | Hydroxyl |

Various compounds can be utilized with the above-mentioned hydratable polymers in an aqueous concentrate composition to inhibit or retard the hydration rate of the polymers, and therefore, delay a viscosity increase in the concentrate for a required period of time. Depending upon the particular functional groups contained in the polymer, different inhibitors react with the functional groups to inhibit hydration. For example, inhibitors for cis-hydroxyl functional groups include compounds containing multivalent metals which are capable of releasing the metal ions in an aqueous solution, borates, silicates, and aldehydes. Examples of the multivalent metal ions are chromium, zirconium, antimony, titanium, iron (ferrous or ferric), tin, zinc and aluminum. Inhibitors for hydroxyl functional groups include mono- and di-functional aldehydes containing from about 1 to about 5 carbon atoms and multivalent metal salts that form hydroxide. Multivalent metal salts or compounds can be utilized as inhibitors for the hydroxyl functional groups in polyvinyl alcohol and sulfate functional groups. Inhibitors for amides include aldehydes and multivalent metal salts or compounds. Generally, any compound can be used as an inhibitor for a hydratable polymer if the compound reacts or otherwise combines with the polymer to cross-link, form a complex or otherwise tie-up the functional groups of the polymer whereby the rate of hydration of the polymer is retarded.

As stated above, the functional groups contained in the polymer or polymers utilized must be in sufficient concentration and in a reactive position to interact with the inhibitors. Preferred hydratable polymers which yield high viscosities upon hydration, i.e., apparent viscosities in the range of from about 10 centipoises to about 80 centipoises at a concentration in the range of from about 10 lbs/1000 gals. to about 80 lbs/1000 gals. in water, are guar gum and guar derivatives such as hydroxypropyl guar and carboxymethylguar, cellulose derivatives such as hydroxyethylcellulose, carboxymethylcellulose, and carboxymethylhydroxyethylcellulose, locust bean gum, carrageenan gum and xanthan gum. Xanthan gum is a biopolysaccharide produced by the action of bacteria of the genus Xanthonomas. Generally, such polymers can be present in the aqueous concentrate of this invention in an amount in the range of from about 100 to about 3000 lbs/1000 gals. of water used and the hydration of the polymers can be inhibited or retarded by various inhibitors present in the concentrate in an amount in the range of from about 0.03 to about 1000 lbs/1000 gals. of water used. The reversal of the inhibition of such polymers by the inhibitors can be accomplished by a change in the pH of the concentrate or by heating the concentrate to an appropriate temperature, generally above about 140° F. At lower concentrations of inhibitor, the resulting concentrate is less retarded from hydration and has a shorter storage life. At higher inhibitor concentrations, the retardation and storage life are increased, but the retardation may be more difficult to reverse, i.e., a greater change in pH or heating to a higher temperature may be required.

Examples of some of the inhibitors which can be utilized depending upon the particular polymer or polymers used in the concentrate are sodium sulfite-sodium dichromate, aluminum sulfate, triethanol amine titanium chelate, basic potassium pyroantimonate, zinc chloride, iron chloride, tin chloride, zirconium oxychloride in hydrochloric acid solution, sodium tetraborate and glyoxal. Basic compounds such as sodium hydroxide, potassium hydroxide, amines and organic bases are utilized in certain of the liquid gel concentrates of this invention to adjust the pH of the concentrates to the range where the inhibitor or inhibitors utilized inhibit the hydration of the polymer or polymers used. In addition, in some of the concentrates, the basic compound or compounds function to inhibit or supplement the inhibition of the polymer or polymers.

In order to give the liquid gel concentrate an initial viscosity, preferably within the range of from about 15 centipoises to about 300 centipoises, whereby suspended materials in the concentrate are maintained in suspension during the storage and handling thereof, a quantity of hydrated polymer is preferably included in the concentrate. The same polymer can be utilized to impart initial viscosity to the concentrate as the inhibited polymer in the concentrate, but in this event, the quantity of polymer utilized to impart initial viscosity to the concentrate must be combined with the water used so that it will hydrate prior to combining the inhibitor utilized and additional polymer. For those polymers where hydration takes place most rapidly at pH conditions below neutral, a weak acid such as fumaric can be added to the water-polymer mixture to lower the pH thereof to the desired level. For those polymers where hydration takes place most rapidly at a pH above neutral, a suitable base such as sodium hydroxide can be added to the mixture.

An alternate and more preferred technique is to utilize a polymer for imparting viscosity to the concentrate which is not inhibited by the particular inhibitor utilized. In this technique, the polymer for imparting initial viscosity to the concentrate does not have to be added to the water prior to the inhibitor making the addition of other additives to the concentrate less difficult. Other additives which can be utilized in the concentrate include salts, surfactants, fluid loss control additives, freezing point depressants such as alcohols, complexing agents, etc.

A liquid gel concentrate of this invention is comprised of water, hydroxypropyl guar present in the concentrate in an amount in the range of from about 300 to about 3000 lbs/1000 gals. of water, sodium tetraborate present in the concentrate in an amount in the range of from about 0.1 to about 1000 lbs/1000 gals. of water and a base such as sodium hydroxide present in the concentrate in an amount sufficient to adjust the pH thereof to a value in the range of from about 9 to about 14. A more preferred concentrate of this type contains hydroxypropyl guar in an amount in the range of from about 500 to about 1500 lbs/1000 gals. of water, most preferably from about 700 to about 900 lbs/1000 gals. of water, sodium tetraborate in an amount in the range of from about 2 to about 20 lbs/1000 gals. of water, most preferably from about 6 to about 12 lbs/1000 gals. of water, and a base such as sodium hydroxide present in an amount to adjust the pH of the concentrate to a value in the range of from about 9 to about 14. For the most preferred concentrate described above, a quantity of sodium hydroxide of about 30–50 lbs/1000 gals. of water is utilized.

In preparing the above-described concentrate, the sodium tetraborate inhibitor is combined with the water used followed by the sodium hydroxide to adjust the pH of the mixture to a value in the range of from about 9 to about 14. The hydroxypropyl guar is then combined with the mixture to produce an aqueous hydration inhibited concentrate having a storage life in the range of from about 1 to about 90 days depending on the quantitative ratio of hydratable polymer to inhibitor utilized. The sodium tetraborate inhibitor retards the rate of hydration of the hydroxypropyl guar in the concentrate, but hydration of the hydroxypropyl guar gradually occurs with time. Thus, the effective storage life of the concentrate is the time period between when the concentrate is initially prepared and when the concentrate attains a viscosity such that it cannot effectively be handled or pumped, i.e., a viscosity above about 500 centipoises. The term "storage life" is used hereinafter to mean the time period between preparation of a concentrate and when the concentrate reaches a viscosity of about 500 centipoises.

If it is desired to impart initial viscosity to the above-described concentrate, prior to combining other components of the concentrate with the water used, fumaric or other acid can be combined with the water in an amount sufficient to lower the pH thereof to a value less than about 6.5 followed by combining an initial quantity of hydroxypropyl guar therewith in an amount in the range of from about 10 to about 25 lbs/1000 gals. of water. The initially combined hydroxypropyl guar is allowed to hydrate to produce a base fluid having a viscosity in the range of from about 3 to about 15 centipoises.

When the concentrate is utilized to produce subterranean formation treating fluids, it preferably contains one or more clay stabilizers such as potassium chloride, sodium chloride, calcium chloride, ammonium chloride, water soluble potassium and aluminum salts and/or compatible organic ionic polymers. The clay stabilizer or stabilizers can be present in the concentrate in amounts up to about 2500 lbs/1000 gals. of water. Other additives such as alcohols to lower freezing point, surfactants, fluid loss control agents, complexors, etc., can also be included in the concentrate to bring about desired results.

In preparing the concentrate having initial viscosity, the acid and initial quantity of hydroxypropyl guar for increasing the viscosity of the concentrate are thoroughly mixed with the water used. If a clay stabilizer such as potassium chloride is included in the concentrate, it is next combined with the hydrated hydroxypropyl guar-water mixture. The sodium tetraborate inhibitor is next combined with the mixture and the pH thereof is adjusted to a value in the range of from about 9 to about 14 by combining a base, e.g., sodium hydroxide therewith. The hydroxypropyl guar to be inhibited by the sodium tetraborate is combined with the mixture last to produce a concentrate having a viscosity in the range of from about 10 to about 100 centipoises and having a storage life in the range of from about 1 to about 90 days.

Another liquid gel concentrate of this invention is comprised of water, hydrated hydroxyethylcellulose or other polymer which is inhibited by sodium tetraborate-decahydrate present in the concentrate in an amount in the range of from about 10 to about 80 lbs/1000 gals. of water, hydroxypropyl guar present in the concentrate in an amount in the range of from about 300 to about 3000 lbs/1000 gals. of water, sodium tetraborate inhibitor present in the concentrate in an amount in the range of from about 0.1 to about 1000 lbs/1000 gals. of water and a base, e.g., sodium hydroxide present in the concentrate in an amount sufficient to adjust the pH thereof to a value in the range of from about 9 to about 14. A more preferred concentrate of this type contains hydroxypropyl guar in an amount in the range of from about 500 to about 1500 lbs/1000 gals. of water, most preferably from about 700 to about 900 lbs/1000 gals. of water, and sodium tetraborate in an amount in the range of from about 2 to about 20 lbs/1000 gals. of water, most preferably from about 6 to about 12 lbs/1000 gals. of water. If desired, the concentrate can include a clay stabilizer in an amount up to about 2500 lbs/1000 gals. of water and other additives of the type mentioned above.

In preparing the foregoing concentrate, the hydroxyethylcellulose or other uninhibited polymer utilized to impart initial viscosity to the concentrate can be combined therewith last. A preferred procedure for preparing this concentrate is to first combine the clay stabilizer, if included, with the water utilized, followed by the addition of the sodium tetraborate inhibitor to the water-stabilizer mixture. The sodium hydroxide or other base is next combined with the mixture followed by the hydroxypropyl guar. After hydroxypropyl guar has been combined with the mixture, the hydroxyethylcellulose or other uninhibited polymer is combined therewith. If a fluid loss control additive is included in the concentrate it is preferably combined with the mixture prior to the hydroxyethylcellulose to minimize mixing difficulties, and if a surfactant is included, it is preferably combined with the concentrate after the hydroxyethylcellulose to minimize foaming. The resulting liquid gel concentrate has an initial viscosity in the range of from about 10 to about 100 centipoises and a storage life of from about 1 to about 90 days.

Yet another liquid gel concentrate of the present invention is comprised of water, guar gum present in the concentrate in an amount in the range of from about 300 to about 1500 lbs/1000 gals. of water, aluminum sulfate present in the concentrate in an amount in the range of from about 20 to about 350 lbs/1000 gals. of water, and a base, e.g., sodium hydroxide present in the concentrate in an amount sufficient to adjust the pH thereof to a value in the range of from about 9 to about 13. A more preferred concentrate of this type contains guar gum in an amount in the range of from about 500 to about 1000 lbs/1000 gals. of water, most preferably from about 700 to about 900 lbs/1000 gals. of water, and aluminum sulfate in an amount in the range of from about 100 to about 300 lbs/1000 gals. of water, most preferably from about 200 to about 300 lbs/1000 gals. of water.

In preparing the guar gum-aluminum sulfate concentrate, the aluminum sulfate is combined with the water used first, followed by the addition of the base followed by the addition of the guar gum. The concentrate can also include hydrated hydroxyethylcellulose or other polymer which is uninhibited by aluminum sulfate to impart initial viscosity thereto in an amount in the range of from about 10 to about 80 lbs/1000 gals. of water as well as other additives. As described above in connection with the hydroxypropyl guar-sodium tetraborate concentrate, the hydroxyethylcellulose or other uninhibited polymer can be added to the concentrate last to produce a concentrate having an initial viscosity in the range of from about 10 to about 100 centipoises and a storage life of from about 1 to about 90 days.

Still another liquid gel concentrate of this invention is comprised of water, carboxymethylcellulose present in the concentrate in an amount in the range of from about 300 to about 3000 lbs/1000 gals. of water and aluminum sulfate present in the concentrate in an amount in the range of from about 75 to about 750 lbs/1000 gals. of water. The resulting concentrate has a pH in the range of from about 2.5 to about 4.5 and the inhibition of the hydration of the carboxymethylcellulose by the aluminum sulfate can be reversed by increasing the pH as will be described further hereinbelow. A more preferred concentrate of this type contains carboxymethylcellulose in an amount in the range of from about 500 to about 1500 lbs/1000 gals. of water, most preferably from about 700 to about 1100 lbs/1000 gals. of water and aluminum sulfate in an amount in the range of from about 100 to about 375 lbs/1000 gals. of water, most preferably from about 150 to about 250 lbs/1000 gals. of water.

In preparing this concentrate, the aluminum sulfate inhibitor is first combined with the water used followed by the addition of the carboxymethylcellulose to produce a concentrate having a storage life of from about 1 to about 120 days. Like the other concentrates described above, the carboxymethylcellulose-aluminum sulfate concentrate can include hydrated hydroxyethylcellulose or other polymer which is uninhibited by aluminum sulfate to impart initial viscosity thereto present in the concentrate in an amount in the range of from about 10 to about 80 lbs/1000 gals. of water as well as other additives. The resulting liquid gel concentrate has an initial viscosity in the range of from about 10 to about 100 centipoises.

In utilizing the above-described liquid gel concentrates to produce a large volume of highly viscous treating fluid, the concentrate is diluted with additional water and the pH of the resulting fluid is lowered or raised or the fluid is heated whereby the innibition reaction between the hydratable polymer and inhibitor contained in the concentrate is reversed and the hydratable polymer yields viscosity. In order to reverse the inhibition of concentrates such as the hydroxypropyl guar-sodium tetraborate concentrate and guar gum-aluminum sulfate concentrates described above, the pH can be lowered to a value in the range of from about 5 to about 9 during or after the concentrate is diluted with water by combining an acid therewith. In order to reverse the inhibition of concentrates such as the carboxymethylcellulose-aluminum sulfate concentrate described above, the pH can be raised to a value in the range of from about 8 to about 13 during or after the concentrate is diluted with water by combining a base therewith. As stated above, the liquid concentrates can be utilized to form a high viscosity fluid without dilution with additional water, and in this event, the same procedure as described above can be used to reverse the inhibition of the concentrates. As also stated above, the concentrates or diluted concentrates can be caused to yield viscosity by heating to a temperature of about 140° F. without changing the pH thereof. Higher temperatures may be required depending upon the particular polymer-inhibitor combination used.

A preferred method of utilizing the liquid concentrates of this invention in the treatment of subterranean formations is to mix the concentrate used with additional water containing a quantity of acid such as acetic acid or a base such as sodium carbonate or sodium hydroxide whereby the pH of the resulting mixture is changed to an appropriate value for reversing the inhibition reaction. The mixing of the concentrate with the additional water containing acid or base can be carried out in a batch process or a continuous process. Preferably, the mixing of the concentrate with additional water containing acid or base is carried out continuously as the high viscosity treating fluid produced is introduced into the formation. If the formation to be treated has a temperature such that the diluted gel concentrate will be heated to an appropriate temperature and the treatment lends itself to allowing the treating fluid to heat up prior to yielding viscosity, the pH of the fluid need not be adjusted prior to introducing the fluid into the formation. The particular quantity of water combined with the concentrate depends on the quantity and type of hydratable polymer contained in the concentrate as well as the viscosity of the resulting treating fluid. By way of example, a concentrate containing 800 lbs. of hydroxypropyl guar per 1000 gallons of water can be diluted with 15 parts of additional water per part of concentrate to produce a fluid having a viscosity in the range of from about 30 to about 35 centipoises.

Examples of other hydratable polymer-inhibitor combinations which can be utilized in the aqueous gel concentrates of this invention and which are pH and/or temperature reversible are as follows:

| Polymer or Polymers | Inhibitor |
| --- | --- |
| Guar gum | Sodium sulfite and sodium dichromate mixture |
| Guar Gum and Hydroxypropyl guar | Sodium sulfite and sodium dichromate mixture |
| Hydroxypropyl guar and carrageenan gum | Sodium hydroxide |
| Guar gum and hydroxypropyl guar | Basic potassium pyroantimonate |
| Guar gum and hydroxypropyl guar | Zinc chloride |
| Guar gum and hydroxypropyl guar | Iron chloride |
| Guar gum | Iron chloride |
| Hydroxypropyl guar and locust bean gum | Tin chloride |
| Hydroxypropyl guar, locust bean gum and carrageenan gum | Zirconium oxychloride in hydrochloric acid solution |
| Guar gum, hydroxypropyl guar and carrageenan gum | Sodium silicate |
| Guar, hydroxypropyl guar, locust bean gum and carrageenan gum | Sodium tetraborate |
| Hydroxypropyl guar, hydroxyethylcellulose, and xanthan gum | Glyoxal |
| Polyacrylate | Chrome alum |
| polyacrylamide | Chrome alum |

The liquid gel concentrates of this invention and high viscosity fluids produced therefrom can be utilized in a great variety of applications including, but not limited to, suspending explosive materials used in mining, drilling and other similar applications, carrying out production stimulation procedures in oil, gas and water wells, carrying out subterranean well completions, transporting proppant or other materials into desired areas in subterranean well formations, diverting fluids in subterranean well formations and carrying out cleaning procedures such as in cleaning tubular goods, production equipment and industrial equipment.

The high viscosity aqueous fluids produced using the liquid gel concentrates are particularly suitable as treating fluids in carrying out subterranean well formation acidizing, fracturing, fracture-acidizing and other procedures. In these applications, the liquid gel concentrates of this invention provide particular advantages in addition to those mentioned above. More particularly, a variety of techniques can be utilized to control the viscosity of the treating fluids produced from the liquid gel concentrates during use. For example, when concentrates are utilized which yield viscosity, i.e., the inhibition reaction is reversed, upon changing the pH of the concentrates as well as upon heating the concentrates and with the passage of time, the pH of the concentrates can be changed at the surface to a level whereby only partial hydration of the gelling agent or agents occurs and the resulting treating fluid is imparted an intermediate viscosity whereby it can be introduced into a subterranean formation to be treated without incurring high friction losses, etc. After the treating fluid has been introduced into the formation, the gelling agent or agents are further hydrated to yield maximum viscosity by being heated to formation temperature, or by the passage of time, or both. Also, after reaching the formation and full hydration of the gelling agent or agents occurs, the inhibitor or inhibitors contained in the fluid can be such that they cross-link or complex the hydrated gelling agents to further increase the viscosity of the treating fluid through a change in pH of the fluid, time and/or temperature. In addition to, or in lieu of, selecting an inhibitor or inhibitors which cross-link or complex the hydrated gelling agent or agents, separate cross-linking or complexing agents can be included in the concentrates or in the additional water used if the concentrates are diluted which function after the treating fluid is introduced into the formation.

Another technique which can be utilized is to include selected gelling agents and inhibitors in the concentrate used whereby upon changing pH or other condition of the concentrate at the surface, one or more of the gelling agents therein are hydrated while one or more other gelling agents in the concentrate remain inhibited. Upon introducing the resulting fluid into the formation to be treated the remaining inhibited gelling agents in the fluid are caused to hydrate by temperature, time or change in other condition of the fluid. An example of this technique when using hydroxypropyl guar gelling agent is to inhibit a portion of the hydroxypropyl guar with sodium tetraborate-decahydrate and another portion of hydroxypropyl guar with an antimony inhibitor. Upon changing the pH of the concentrate or treating fluid produced at the surface, the borate inhibited hydroxypropyl guar is hydrated, but the antimony inhibited hydroxypropyl gaur remains inhibited. After introduction of the treating fluid into the formation, the antimony inhibited hydroxypropyl guar is hydrated by the passage of time and/or heating to the foremation temperature, or change in other condition.

Yet another technique which can be utilized when using concentrates containing pH reversible inhibitors is to change the pH of the treating fluid produced to a level so that hydration occurs for a controlled period of time on the surface, and only partial hydration occurs, i.e., lowering or raising the pH of the concentrate followed by returning the pH to its original value on the surface. Upon introducing the treating fluid into a formation to be treated, the fluid is fully hydrated by time, temperature or other condition change.

As will be understood by those skilled in the art, other techniques can be utilized to control the hydration of all or part of the gelling agent or agents used in the concentrates of this invention to produce treating fluids having desired viscosities at desired times while treatments using the fluids are carried out.

In order to further illustrate the liquid gel concentrates and methods of this invention, the following examples are given:

EXAMPLE 1

Various hydratable polymers are combined with water, a base to adjust the pH of the mixtures to from about 9 to about 14 and various inhibitors to determine if the inhibitors react with or otherwise function to retard the hydration rate of the polymers, and if so, to determine if the inhibition reaction is reversible upon lowering the pH of the mixture. The base utilized is sodium hydroxide and the pH of the various mixtures is lowered by adding a quantity of hydrochloric acid or a blend of acetic acid and acetic anhydride to the mixtures to lower the pH thereof to a value below about 9. The results of these tests are given in Table I below.

Apparent viscosity measurements are taken from a direct reading Model 35 FANN VG meter, using a number 1 spring standard bob and sleeve at 300 rpm and at room temperature. The apparent viscosity is in units of consistency which are approximately equal to centipoises.

TABLE I

INHIBITION AND REVERSIBILITY OF VARIOUS HYDRATABLE POLYMER-INHIBITOR COMBINATIONS

| Hydratable Polymer | Quantity of Hydratable Polymer-Lbs/ 1000 Gallons Of Water | Quantity of NaOH-Lbs/ 1000 Gallons Of Water | Inhibitor | Quantity of Inhibitor-Lbs/ 1000 Gallons Of Water | Viscosity of Mixture in Units of Consistency After 3 Mins. | After 15 Mins. | Reversible Upon Lowering pH |
|---|---|---|---|---|---|---|---|
| Guar Gum | 300 | 0 | None | 0 | >300 | >300 | — |
| Guar Gum | 300 | 90 | Mixture of 75% by Wt. Sodium Sulfite and 25% by Wt. Sodium Dichromate | 200 | 9 | 9 | Yes |
| Guar Gum | 300 | 90 | $Al_2(SO_4)_3$ | 100 | 3 | 3 | Yes |
| Guar Gum | 300 | 90 | Basic Potassium Pyroantimonate | 50 (Gal/1000 Gal) | 60 | 60+ | Yes |
| Guar Gum | 300 | 90 | $ZnCl_2$ | 100 | 143.5 | 215.5 | Yes |
| Guar Gum | 300 | 90 | $FeCl_2 \cdot 4H_2O$ | 100 | 177 | 275 | Yes |
| Guar Gum | 300 | 90 | $FeCl_3 \cdot 6H_2O$ | 100 | 83 | 97 | Yes |
| Guar Gum | 300 | 90 | $Na_2SiO_3 \cdot 9H_2O$ | 100 | 223 | >300 | Yes |
| Guar Gum | 300 | 90 | Sodium Tetraborate-Decahydrate | 100 | 3 | 3 | Yes |
| Hydroxypropyl Guar | 300 | 0 | None | 0 | 35 | >300 | — |
| Hydroxypropyl Guar | 300 | 60 | Sodium Dichromate | 30 | 6 | 9.5 | Yes |
| Hydroxypropyl Guar | 300 | 205 | None | 0 | 6 | 9.5 | Yes |
| Hydroxypropyl Guar | 300 | 75 | Basic Potassium Pyroantimonate | 30 (Gal/1000 Gal) | 6 | 9 | Yes |
| Hydroxypropyl Guar | 300 | 90 | $Al_2(SO_4)_3$ | 100 | 4.5 | 6 | Yes |

TABLE I-continued
INHIBITION AND REVERSIBILITY OF VARIOUS HYDRATABLE POLYMER-INHIBITOR COMBINATIONS

| Hydratable Polymer | Quantity of Hydratable Polymer-Lbs/ 1000 Gallons Of Water | Quantity of NaOH-Lbs/ 1000 Gallons Of Water | Inhibitor | Quantity of Inhibitor-Lbs/ 1000 Gallons Of Water | Viscosity of Mixture in Units of Consistency After 3 Mins. | Viscosity of Mixture in Units of Consistency After 15 Mins. | Reversible Upon Lowering pH |
|---|---|---|---|---|---|---|---|
| Hydroxypropyl Guar | 300 | 90 | ZnCl$_2$ | 100 | 9.5 | 9.5 | Yes |
| Hydroxypropyl Guar | 300 | 90 | FeCl$_2$ . 4H$_2$O | 100 | 7 | 8.5 | Yes |
| Hydroxypropyl Guar | 300 | 90 | FeCl$_3$ . 6H$_2$O | 100 | 7.5 | 8 | Yes |
| Hydroxypropyl Guar | 300 | 90 | SnCl$_2$ . 2H$_2$O | 100 | 3 | 3 | Yes |
| Hydroxypropyl Guar | 300 | 90 | Zirconium Oxychloride in Hydrochloric Acid Solution | 25 (Gal/1000 Gal) | 9.5 | 8.5 | Yes |
| Hydroxypropyl Guar | 300 | 90 | Na$_2$SiO$_3$ . 9H$_2$O | 100 | 6 | 9 | Yes |
| Hydroxypropyl Guar | 300 | 90 | Sodium Tetraborate-Decahydrate | 100 | 3 | 3 | Yes |
| Locust Bean Gum | 300 | 0 | None | 0 | 154 | >300 | — |
| Locust Bean Gum | 300 | 90 | Al$_2$(SO$_4$)$_3$ | 100 | 3.5 | 4.5 | Yes |
| Locust Bean Gum | 300 | 90 | SnCl$_2$ . 2H$_2$O | 100 | 3 | 3 | Yes |
| Locust Bean Gum | 300 | 500 | Zirconium Oxychloride in HCl Solution | 25 (Gal/1000 Gal) | 42.5 | 149 | Yes |
| Locust Bean Gum | 300 | 90 | Sodium Tetraborate-Decahydrate | 100 | 3 | 3 | Yes |
| Carrageenin Gum | 300 | 0 | None | 0 | >300 | >300 | — |
| Carrageenin Gum | 300 | 500 | Zirconium Oxychloride in HCl Solution | 25 (Gal/1000 Gal) | 182.5 | 230 | Yes |
| Carrageenin Gum | 300 | 90 | Na$_2$SiO$_3$ . 9H$_2$O | 100 | 284 | 275 | Yes |
| Carrageenin Gum | 300 | 90 | Sodium Tetraborate-Decahydrate | 100 | 216 | 287.5 | Yes |

EXAMPLE 2

Various hydratable polymers reacted with glyoxal are combined with water and the pH of the mixture adjusted to the values given in Table II below to determine if hydration occurs, and if not, to determine if the inhibition reaction is reversible upon raising the pH of the mixture by adding sodium hydroxide thereto. The results of these tests are given in Table II below:

TABLE II
INHIBITION AND REVERSIBILITY OF VARIOUS HYDRATABLE POLYMERS-GLYOXAL COMBINATIONS

| Hydratable Polymer Reacted With Glyoxal | Quantity of Glyoxalated Hydratable Polymer-Lbs/ 1000 Gallons Of Water | pH of Mixture | Viscosity of Mixture in Units of Consistency After 3 Mins. | Viscosity of Mixture in Units of Consistency After 15 Mins. | Reversible Upon Raising pH |
|---|---|---|---|---|---|
| Glyoxalated Hydroxyethylcellulose | 300 | 3.4 | 2.5 | 2.5 | Yes |
| Glyoxalated Hydroxypropyl Guar | 300 | 3.4 | 2.5 | 3.5 | Yes |
| Glyoxalated Xanthan Gum | 300 | 1.0 | 179 | >300 | Yes |

EXAMPLE 3

Various hydratable polymers are tested for hydration inhibition and pH reversibility using aluminum sulfate inhibitor. Concentrates are prepared by combining the aluminum sulfate with water in the amounts given in Table III below, followed by combining the hydratable polymers, bases and/or acids given in Table III below with the water-inhibitor mixtures in polymer amounts of 300 lbs/1000 gals. of water. Apparent viscosity measurements are conducted in the manner described in Example 1 above after which the reversibility of the concentrates is determined by combining sodium hydroxide with the concentrates to raise the pH thereof to a value above about 9. The results of these tests are given in Table III below.

TABLE III
COMPARISON OF ALUMINUM SULFATE INHIBITED CONCENTRATES USING VARIOUS HYDRATABLE POLYMERS

| Hydratable Power | Quantity of Aluminum Sulfate Inhibitor, Lbs/1000 Gals. of Water Used | Quantity of Sodium Hydroxide, Lbs/1000 Gals. of Water Used | Quantity of Fumaric Acid Used, Lbs/1000 Gals. of Water | Apparent Viscosity 3 Mins. | Apparent Viscosity 15 Mins. | Reversible Upon Raising or Lowering pH |
|---|---|---|---|---|---|---|
| Hydroxypropyl Guar | 100 | 90 | 0 | 4.5 | 6 | Yes[1] |
| Hydroxypropyl Guar | 150 | 90 | 0 | 7 | 9.5 | Yes[1] |
| Hydroxypropyl Guar | 20 | 75 | 0 | 4 | 6.5 | Yes[1] |
| Hydroxypropyl Guar | 250 | 180 | 0 | 3 | 3.5 | Yes[1] |

TABLE III-continued
COMPARISON OF ALUMINUM SULFATE INHIBITED CONCENTRATES USING VARIOUS HYDRATABLE POLYMERS

| Hydratable Power | Quantity of Aluminum Sulfate Inhibitor, Lbs/1000 Gals. of Water Used | Quantity of Sodium Hydroxide, Lbs/1000 Gals. of Water Used | Quantity of Fumaric Acid Used, Lbs/1000 Gals. of Water | Apparent Viscosity 3 Mins. | Apparent Viscosity 15 Mins. | Reversible Upon Raising or Lowering pH |
|---|---|---|---|---|---|---|
| Carboxymethylcellulose | 100 | 0 | 0 | 4 | 6 | Yes[2] |
| Carboxymethylcellulose | 100 | 0 | 5 | 5 | 5 | Yes[2] |
| Carboxymethylcellulose | 75 | 0 | 5 | 18 | 15 | Yes[2] |
| Carboxymethylcellulose | 100 | 5 | 0 | 9.5 | 9 | Yes[2] |
| Carboxymethylcellulose | 100 | 10 | 0 | 13.5 | 11.5 | Yes[2] |
| Carboxymethylcellulose | 100 | 0 | 10 | 5.5 | 5 | Yes[2] |
| Guar Gum | 150 | 90 | 0 | 7 | 9.5 | Yes[1] |
| Guar Gum | 160 | 90 | 0 | 50 | 106 | Yes[1] |
| Guar Gum | 175 | 180 | 0 | 3 | 3 | Yes[1] |
| Guar Gum | 250 | 180 | 0 | 3 | 3.5 | Yes[1] |
| Guar Gum | 50 | 180 | 0 | 3 | 3.5 | Yes[1] |
| Guar Gum | 10 | 180 | 0 | 4 | 6.5 | Yes[1] |
| Guar Gum | 5 | 180 | 0 | 5.5 | 11 | Yes[1] |
| Guar Gum | 0 | 180 | 0 | >300 | — | — |
| Guar Gum | 10 | 20 | 0 | 42 | 91.5 | Yes[1] |
| Guar Gum | 10 | 30 | 0 | 20.5 | 50 | Yes[1] |
| Guar Gum | 10 | 40 | 0 | 11 | 30 | Yes[1] |
| Guar Gum | 10 | 50 | 0 | 8.5 | 18 | Yes[1] |
| Guar Gum | 10 | 75 | 0 | 6 | 11 | Yes[1] |
| Guar Gum | 20 | 75 | 0 | 4 | 6 | Yes[1] |
| Guar Gum | 20 | 20 | 0 | 40 | 101.5 | Yes[1] |
| Guar Gum | 20 | 50 | 0 | 5.5 | 10 | Yes[1] |
| Guar Gum | 20 | 100 | 0 | 4 | 7.0 | Yes[1] |

[1] pH lowered by adding HCl
[2] pH raised by adding NaOH

EXAMPLE 4

A number of liquid gel concentrates containing hydropropyl guar polymer in an amount of 1000 lbs/1000 gals. of water used, sodium tetraborate-decahydrate inhibitor, sodium hydroxide, hydrated hydroxyethylcellulose and potassium chloride in the amounts indicated in Table IV below are prepared by combining 80° F. tap water with potassium chloride in a blender. Sodium hydroxide is next combined with the mixture followed by sodium tetraboratedecahydrate. After blending for about 2 minutes, the hydroxypropyl guar is combined with the mixture followed by the hydroxyethylcellulose. The concentrates are allowed to remain in a static state for about 24 hours after which they are diluted with additional water containing the amounts of weak organic acid (blend of acetic acid and acetic anhydride) given in Table IV at 40° F., 60° F. and 80° F. to produce fluids containing about 40 lbs. of hydrated hydroxypropyl guar per 1000 gals. of water. After dilution, the pH of the fluids and apparent viscosities of the fluids are measured in the manner described in Example 1 at the intervals and over the time period given in Table IV. The results of these tests are given in Table IV below.

TABLE IV

COMPARISON OF AQUEOUS FLUIDS PRODUCED FROM VARIOUS HYDROXYPROPYL GUAR-SODIUM TETRABORATE-DECAHYDRATE LIQUID GEL CONCENTRATES

| Quantity of Sodium Hydroxide In Concentrate, lbs/1000 gals. of Water in Concentrate | Quantity of Sodium Tetraborate-Decahydrate In Concentrate, lbs/1000 gals. of Water in Concentrate | Quantity of Potassium Chloride in Concentrate, lbs/1000 gals. of Water in Concentrate | Quantity of Hydrated Hydroxyethyl-Cellulose in Concentrate, lbs/1000 gals. of Water in Concentrate | Quantity of Organic Acid In Water Used To Dilute Concentrate, gals/1000 gals. of Water in Concentrate | pH of Diluted Fluid | Apparent Viscosity of Diluted Fluid Time (Minutes) |  |  |  |  |  |  |  | Temperature of Diluted Water °F. |
|---|---|---|---|---|---|---|---|---|---|---|---|---|---|---|---|
| | | | | | | 0.5 | 1 | 1.5 | 2 | 2.5 | 3 | 4 | 5 | 10 | |
| 60 | 10 | 2500 | 40 | 0.5 | 6.50 | 8 | 10.5 | 14.5 | 17.5 | 21 | 25.5 | 30 | 33 | 38 | 40 |
| 120 | 10 | 2500 | 40 | 1.0 | 5.65 | 14 | 21 | 24.5 | 27.5 | 29.5 | 31 | 32 | 32.5 | | 80 |
| 60 | 10 | 2500 | 40 | 1.25 | 4.53 | 14 | 20 | 25 | 28.5 | 31 | 32.5 | 34.5 | 35.5 | 37 | 40 |
| 60 | 20 | 2500 | 40 | 0.75 | 5.21 | 14 | 21 | 26 | 28.5 | 30.5 | 32 | 33 | 34 | | 80 |
| 120 | 40 | 2500 | 40 | 1.25 | 5.13 | 13.5 | 20 | 25 | 28 | 29 | 30.5 | 32 | 32.5 | | 80 |
| 90 | 40 | 2500 | 40 | 0.75 | 6.60 | 7 | 10.5 | 15 | 22 | 25 | 27.5 | 30.5 | 32.5 | | 80 |
| 60 | 20 | 2500 | 40 | 1.25 | 4.80 | 15 | 21 | 26.5 | 28.5 | 31.5 | 32.5 | 33.5 | 34.5 | | 80 |
| 60 | 10 | 2500 | 40 | 0.5 | 6.65 | 7 | 13 | 18 | 22.5 | 24.5 | 28.5 | 31 | 32 | | 60 |
| 60 | 10 | 2500 | 40 | 0.75 | 5.24 | 10 | 17 | 23 | 25.5 | 28 | 30 | 32 | 34 | | 60 |
| 120 | 40 | 2500 | 40 | 1.0 | 5.83 | 9 | 15 | 19.5 | 25 | 27.5 | 30.5 | 33 | 34 | 32.5 | 60 |
| 60 | 40 | 2500 | 40 | 0.5 | 7.50 | 3 | 3.5 | 7 | 10 | 15 | 17 | 24 | 27 | | 80 |
| 60 | 40 | 2500 | 40 | 1.25 | 4.68 | 13 | 20 | 27 | 31.5 | 34.5 | 35.5 | 38.5 | 41 | | 40 |
| 60 | 40 | 2500 | 40 | 0.5 | 6.88 | 5 | 5 | 5 | 5 | 5.5 | 6 | 7 | 11 | 30.5 | 40 |
| 120 | 10 | 2500 | 40 | 1.25 | 5.00 | 13 | 20 | 24.5 | 28.5 | 32 | 33.5 | 35 | 36 | 39 | 40 |
| 40 | 40 | 2500 | 40 | 1.25 | 4.60 | 14 | 20.5 | 26.5 | 28.5 | 30.5 | 31 | 32.5 | 33 | | 80 |
| 40 | 40 | 2500 | 40 | 1.25 | 4.52 | 15 | 21.5 | 27 | 29 | 30.5 | 31.5 | 32.5 | 33 | | 80 |
| 90 | 40 | 2500 | 40 | 1.0 | 5.11 | 10.5 | 16 | 21 | 26 | 29 | 32 | 34 | 36.5 | 37.5 | 40 |
| 120 | 40 | 2500 | 40 | 1.25 | 5.09 | 12 | 18 | 23.5 | 26.5 | 30 | 32 | 35 | 36.5 | 39 | 40 |
| 90 | 10 | 2500 | 40 | 0.75 | 6.00 | 11 | 17.5 | 23 | 26.5 | 29 | 31 | 33 | 34 | | 60 |
| 120 | 10 | 2500 | 40 | 1.25 | 5.10 | 14 | 20 | 25 | 28 | 29.5 | 30.5 | 31.5 | 32 | 36 | 80 |
| 120 | 20 | 2500 | 40 | 0.75 | 5.94 | 9 | 13 | 17 | 22.5 | 25.5 | 28.5 | 32.5 | 34.5 | | 40 |
| 90 | 10 | 2500 | 40 | 1.0 | 5.05 | 13 | 18 | 23 | 28 | 30 | 33 | 36 | 37 | 39 | 80 |
| 60 | 10 | 2500 | 40 | 0.5 | 6.50 | 8 | 15 | 20 | 25 | 27.5 | 29 | 31.5 | 32.5 | | 80 |
| 60 | 10 | 2500 | 40 | 0.5 | 6.32 | 8 | 14 | 17 | 20 | 24 | 27 | 31.5 | 34 | 39 | 60 |
| 120 | 40 | 2500 | 40 | 1.0 | 5.81 | 10 | 15.5 | 20.5 | 26 | 28 | 30 | 32 | 33.5 | | 40 |
| 60 | 40 | 2500 | 40 | 0.5 | 7.30 | 3.5 | 4.5 | 7.0 | 11 | 15.5 | 20 | 26 | 29 | | 60 |
| 90 | 20 | 2500 | 40 | 1.25 | 4.78 | 14 | 20 | 25 | 28 | 30.5 | 31.5 | 33 | 34 | | 60 |

From Table IV it can be seen that the rate of hydration of sodium tetraborate-decahydrate inhibited hydroxypropyl guar in a concentrate of this invention is increased by lowering the pH of the diluted fluid and/or increasing the temperature of the diluted fluid.

EXAMPLE 5

Various liquid gel concentrates containing hydroxypropyl guar polymer, sodium tetraborate-decahydrate inhibitor and sodium hydroxide in the amounts given in Table V below as well as potassium chloride and hydrated hydroxyethylcellulose in the amounts of 2500 and 40 lbs/1000 gals. of water, respectively, are prepared in accordance with the procedure described in Example 4. The stability of the concentrates, i.e., the increase in viscosity of the concentrates with time, is determined by measuring the apparent viscosities of the concentrates at the intervals and over the time periods given in Table V in accordance with the procedure given in Example 1. The results of these tests are given in Table V below. The apparent viscosity measurements are taken at a temperature of 110° F. which is higher than normal storage temperatures to simulate the worst storage condition expected.

time period given in Table VI below at 110° F. The results of these tests are given in Table VI below.

TABLE VI
STABILITY OF LIQUID GEL CONCENTRATE CONTAINING 2000 LBS. HYDROXYPROPYL GUAR PER 1000 GALS. OF WATER

| Time, Days | Apparent Viscosity | Observations |
|---|---|---|
| Initial | 80 | Some syneresis of water-consistency of pudding |
| 1 | 81 | Some syneresis of water-consistency of pudding |
| 4 | 81 | Some syneresis of water-consistency of pudding |
| 13 | — | Some syneresis of water-consistency of pudding |
| 43 | — | Same as 1st and 4th days in that consistency appeared the same after stirring in free water. |
| 64 | — | Chunky and semi-solid - not pumpable |

EXAMPLE 7

A liquid gel concentrate containing 800 lbs. of hydroxypropyl guar per 1000 gals. of water, 100 lbs. of

TABLE V
STABILITY OF VARIOUS HYDROXYPROPYL GUAR-SODIUM TETRABORATE-DECAHYDRATE CONCENTRATES

| Quantity of Hydroxypropyl Guar, Lbs/ 1000 Gals. of Water | Quantity of Sodium Tetraborate-Decahydrate, Lbs/1000 Gals. of Water | Quantity of Sodium Hydroxide, Lbs/1000 Gals. of Water | 1 Hr. | 4 Hrs. | 24 Hrs. | 48 Hrs. | 6 Days | 7 Days | 14 Days | 15 Days | 19 Days | 22 Days | 26 Days | 42 Days | 50 Days | 57 Days | 64 Days |
|---|---|---|---|---|---|---|---|---|---|---|---|---|---|---|---|---|---|
| 1500 | 10 | 40 | 200 | 270 | | | | | | | | | | | | | |
| 500 | 40 | 80 | 151 | 140 | 170 | 191 | 237 | 212 | 250 | 344 | 398 | | | | | | |
| 1500 | 5 | 80 | 181 | 298 | 688 | 555 | | | | | | | | | | | |
| 500 | 40 | 80 | 38 | 27 | 27 | 26 | 25 | 24 | 22.5 | | 21 | 21 | 20 | 21 | 20 | 19 | 19.5 |
| 1000 | 10 | 80 | 75 | 73 | 90 | 95.5 | 127.5 | 128 | 190 | | | | | | | | |
| 1000 | 5 | 60 | 81 | 84 | 110 | 141 | 261 | | | | | | | | | | |
| 1500 | 5 | 20 | 183 | | | | | | | | | | | | | | |
| 500 | 40 | 20 | 48 | 35 | 37 | 38 | 40 | 41 | 41.5 | | 41 | 42 | 43 | 46 | 46.5 | 46.5 | 51 |
| 500 | 5 | 80 | 39 | 31 | 34 | 36 | 37 | 44 | 85 | | 165 | | | | | | |
| 500 | 5 | 20 | 45 | 37 | 40 | 42.5 | 48 | 54 | 70 | | 72.5 | 86 | 151 | | | | |
| 1500 | 40 | 20 | 172 | | | | | | | | | | | | | | |
| 1000 | 40 | 20 | 81 | 81 | 94 | 99 | 115 | 120 | 140 | | 150 | 162 | 230 | | | | |
| 500 | 40 | 40 | 46 | 35 | 36 | 38 | 39.5 | 40 | 41.5 | | 42.5 | 43 | 41.5 | 46 | 50 | 55 | 57.5 |
| 500 | 10 | 20 | 47 | 37 | 38 | 39 | 41 | 42 | 47.5 | | 51 | 51 | 58 | 57 | 113 | 135 | |
| 1500 | 40 | 80 | 154 | 149 | 180 | 191 | 279 | 241 | 257 | 263 | 326 | 365 | 389 | | | | |
| 1500 | 5 | 80 | 165 | 267 | | | | | | | | | | | | | |
| 500 | 5 | 80 | 41 | 33 | 36 | 34.5 | 42.5 | 46 | 87 | 86 | 163 | 361 | | | | | |

From Table V it can be seen that the concentrates have good stabilities or storage lives and that the stabilities of the concentrates vary with the particular quantities of polymer, inhibitor and base used.

EXAMPLE 6

A liquid gel concentrate containing 2000 lbs. of hydroxypropyl guar polymer per 1000 gals. of water, 500 lbs. of sodium tetraboratedecahydrate inhibitor per 1000 gals. of water, 1000 lbs. of sodium hydroxide per 1000 gals. of water and 2500 lbs. of potassium chloride per 1000 gals. of water is prepared in accordance with the procedure described in Example 3.

The storage life of the concentrate is determined by observing the concentrate and measuring the apparent viscosity of the concentrate at the intervals and over the sodium tetraboratedecahydrate per 1000 gals. of water, 40 lbs. of sodium hydroxide per 1000 gals. of water, 2500 lbs. of potassium chloride per 1000 gals. of water and 40 lbs. of hydrated hydroxyethylcellulose per 1000 gals. of water is prepared in accordance with the procedure described in Example 3. The concentrate is stored at 110° F. for 138 days during which time no appreciable increase in viscosity of the concentrate takes place. The concentrate is then diluted with additional water containing an amount of organic acid (blend of acetic acid and acetic anhydride) equivalent to 0.75 gals. per 1000 gals. of water in the concentrate at a temperature of 80° F. The pH of the resulting fluid is measured as well as the apparent viscosity of the fluid at the intervals and over the time period given in Table VII below. The apparent viscosity measurements are taken in accordance with the procedure set forth in Example 1. The results of these tests are given in Table VII below.

TABLE VII

| HYDRATION RATE OF DILUTED 138 DAY OLD LIQUID GEL CONCENTRATE | | | | | | | | |
|---|---|---|---|---|---|---|---|---|
| | Apparent Viscosity Time (Minutes) | | | | | | | |
| pH | 0.5 | 1 | 1.5 | 2 | 2.5 | 3 | 4 | 5 |
| 5.3 | 10 | 16.5 | 21.5 | 25.5 | 28.5 | 30 | 31 | 32.5 |

From the above it can be seen that the liquid gel concentrate has a long storage life and effectively imparts viscosity to the fluid produced upon dilution with additional water and the lowering of the pH of the fluid.

What is claimed is:

1. A liquid gel concentrate comprising: water;
   hydroxypropyl guar hydratable polymer which yields viscosity upon hydration present in said concentrate in an amount of from about 700 to about 900 lbs/1000 gals. of water;
   sodium hydroxide present in said concentrate in an amount sufficient to produce a concentrate pH in the range of from about 9 to about 14; and
   sodium tetraborate inhibitor having the property of reversibly reacting with said hydratable polymer whereby the rate of hydration of said polymer is retarded at one condition to produce a concentrate effective storage life in the range of about 1–90 days and said reaction is reversed at another condition, said inhibitor being present in said concentrate in an amount of from about 6 to about 12 lbs/1000 gals. of water.

2. The liquid gel concentrate of claim 1 which is further characterized to include hydrated hydroxyethylcellulose present in said concentrate in an amount sufficient to increase the apparent viscosity of said concentrate to an initial value in the range of about 10 centipoises to about 100 centipoises.

3. The liquid gel concentrate of claim 2 which is further characterized to include potassium chloride present in said concentrate in an amount up to about 2500 lbs/1000 gals. of water.

4. A liquid gel concentrate comprising: water;
   guar gum hydratable polymer which yields viscosity upon hydration present in said concentrate in an amount in the range of from about 300 lbs/1000 gals. of water to about 1500 lbs/1000 gals. of water;
   a base present in said concentrate in an amount sufficient to produce a concentrate pH in the range of from about 9 to about 13; and
   aluminum sulfate inhibitor having the property of reversibly reacting with said hydratable polymer whereby the rate of hydration of said polymer is retarded at one condition to produce a concentrate effective storage life in the range of about 1–90 days and said reaction is reversed at another condition, said inhibitor being present in said concentrate in an amount of about 20 lbs/1000 gals. of water to about 350 lbs/1000 gals. of water.

5. The liquid gel concentrate of claim 4 which is further characterized to include a hydrated polymer which is uninhibited by aluminum sulfate present in said concentrate in an amount sufficient to increase the apparent viscosity of said concentrate to an initial value in the range of from about 10 centipoises to about 100 centipoises.

6. The liquid gel concentrate of claim 5 which is further characterized to include a clay stabilizer present in said concentrate in an amount up to about 2500 lbs/1000 gals. of water.

7. A liquid gel concentrate comprising: water;
   carboxymethyl cellulose hydratable polymer which yields viscosity upon hydration present in said concentrate in an amount in the range of from about 300 lbs/1000 gals. of water to about 3000 lbs/1000 gals. of water; and
   aluminum sulfate inhibitor having the property of reversibly reacting with said hydratable polymer whereby the rate of hydration of said polymer is retarded at one condition to produce a concentrate effective storage life of about 1–90 days and said reaction is reversed at another condition, said inhibitor being present in said concentrate in an amount of about 75 lbs/1000 gals. of water to about 750 lbs/1000 gals. of water.

8. The liquid gel concentrate of claim 7 which is further characterized to include a hydrated polymer which is uninhibited by aluminum sulfate present in said concentrate in an amount sufficient to increase the apparent viscosity of said concentrate to an initial value in the range of from about 10 centipoises to about 100 centipoises.

9. The liquid gel concentrate of claim 8 which is further characterized to include a clay stabilizer present in said concentrate in an amount up to about 2500 lbs/1000 gals. of water.

10. A method of forming a high viscosity aqueous treating fluid comprising the steps of:
    forming an inhibited liquid gel concentrate comprised of water, hydroxypropyl guar hydratable polymer which yields viscosity upon hydration present in said concentrate in an amount in the range of from about 300 to about 3000 lbs/1000 gals. of water, a base present in said concentrate in an amount sufficient to produce a concentrate pH in the range of from about 9 to about 14, and sodium tetraborate inhibitor having the property of reversibly reacting with said hydratable polymer whereby the rate of hydration of said polymer is retarded at one condition to produce a concentrate effective storage life of about 1–90 days and said reaction is reversed at another condition, said inhibitor being present in said concentrate in an amount in the range of from about 0.1 lbs. to about 1000 lbs/1000 gals. of water; and
    combining an acid with said concentrate to lower the pH thereof to a value below about 9.

11. The method of claim 10 which is further characterized to include the step of diluting said concentrate with additional water to increase the volume of high viscosity treating fluid formed.

12. The method of claim 11 wherein said liquid gel concentrate is further characterized to include a hydrated polymer which is uninhibited by sodium tetraborate present in said concentrate in an amount sufficient to increase the apparent viscosity of said concentrate to an initial value in the range of from about 10 centipoises to about 100 centipoises.

13. The method of claim 12 wherein said liquid gel concentrate is further characterized to include a clay stabilizer present in said concentrate in an amount up to about 2500 lbs/1000 gals. of water.

14. A method of forming a high viscosity aqueous treating fluid comprising the steps of:

forming an inhibited liquid gel concentrate comprised of water, hydroxypropyl guar hydratable polymer which yields viscosity upon hydration present in said concentrate in an amount in the range of from about 300 to about 3000 lbs/1000 gals. of water, sodium hydroxide present in said concentrate in an amount sufficient to produce a concentrate pH in the range of from about 9 to about 14, and sodium tetraboratedecahydrate inhibitor having the property of reversibly reacting with said hydratable polymer whereby the rate of hydration of said polymer is retarded at one condition to produce a concentrate effective storage life of about 1-90 days and said reaction is reversed at another condition, said inhibitor being present in said concentrate in an amount in the range of from about 0.1 lbs. to about 1000 lbs/1000 gals. of water; and heating said concentrate to a temperature above about 140° F.

15. The method of claim 14 which is further characterized to include the step of diluting said concentrate with additional water to increase the volume of high viscosity treating fluid formed.

16. The method of claim 15 wherein said liquid gel concentrate is further characterized to include hydrated hydroxyethylcellulose present in said concentrate in an amount sufficient to increase the apparent viscosity of said concentrate to an initial value in the range of from about 10 centipoises to about 100 centipoises.

17. The method of claim 16 wherein said liquid gel concentrate is further characterized to include potassium chloride present in said concentrate in an amount up to about 2500 lbs/1000 gals. of water.

18. A method of forming a high viscosity aqueous treating fluid comprising the steps of:

forming an inhibited liquid gel concentrate comprised of water, guar gum hydratable polymer which yields viscosity upon hydration present in said concentrate in an amount in the range of from about 300 to about 1500 lbs/1000 gals. of water, sodium hydroxide present in said concentrate in an amount sufficient to produce a concentrate pH in the range of from about 9 to about 14, and aluminum sulfate inhibitor having the property of reversibly reacting with said hydratable polymer whereby the rate of hydration of said polymer is retarded at one condition to produce a concentrate effective storage life of about 1-90 days and said reaction is reversed at another condition, said inhibitor being present in said concentrate in an amount in the range of from about 20 lbs. to about 350 lbs/1000 gals. of water; and combining an acid with said concentrate to lower the pH thereof to a value below about 9.

19. The method of claim 18 which is further characterized to include the step of diluting said concentrate with additional water to increase the volume of high viscosity treating fluid formed.

20. The method of claim 19 wherein said liquid gel concentrate is further characterized to include a hydrated polymer which is uninhibited by aluminum sulfate present in said concentrate in an amount sufficient to increase the apparent viscosity of said concentrate to an initial value in the range of from about 10 centipoises to about 100 centipoises.

21. The method of claim 20 wherein said liquid gel concentrate is further characterized to include a clay stabilizer present in said concentrate in an amount up to about 2500 lbs/1000 gals. of water.

22. A method of forming a high viscosity aqueous treating fluid comprising the steps of:

forming an inhibited liquid gel concentrate comprised of water, carboxymethylcellulose hydratable polymer which yields viscosity upon hydration present in said concentrate in an amount in the range of from about 300 lbs. to about 3000 lbs/1000 gals. of water and aluminum sulfate inhibitor having the property reversibly reacting with said hydratable polymer whereby the rate of hydration of said polymer is retarded at one condition to produce a concentrate effective storage life of about 1-90 days and said reaction is reversed at another condition, said inhibitor being present in said concentrate in an amount in the range of from about 75 lbs. to about 750 lbs/1000 gals. of water; and combining a base with said concentrate to raise the pH of said concentrate to a value above about 8.

23. The method of claim 22 which is further characterized to include the step of diluting said concentrate with additional water to increase the volume of high viscosity treating fluid formed.

24. The method of claim 23 wherein said liquid gel concentrate is further characterized to include a hydrated polymer which is uninhibited by aluminum sulfate present in said concentrate in an amount sufficient to increase the apparent viscosity of said concentrate to an initial value in the range of from about 10 centipoises to about 100 centipoises.

25. The method of claim 24 wherein said liquid gel concentrate is further characterized to include a clay stabilizer present in said concentrate in an amount up to about 2500 lbs/1000 gals. of water.

* * * * *

UNITED STATES PATENT AND TRADEMARK OFFICE
CERTIFICATE OF CORRECTION

PATENT NO. : 4,336,145
DATED : June 22, 1982
INVENTOR(S) : BRISCOE, James E.

It is certified that error appears in the above-identified patent and that said Letters Patent are hereby corrected as shown below:

In Table III, Column Heading "Hydratable Power" should read --Hydratable Polymer--.

In Table IV, Column Heading "Temperature of Diluted Water $^\circ$F." should read --Temperature of Dilution Water, $^\circ$F.--

UNITED STATES PATENT AND TRADEMARK OFFICE
CERTIFICATE OF CORRECTION

PATENT NO. : 4,336,145

DATED : June 22, 1982

INVENTOR(S) : BRISCOE, James E.

It is certified that error appears in the above-identified patent and that said Letters Patent are hereby corrected as shown below:

In Table V, Column 1 reads:

| Quantity of Hydroxypropyl Guar, Lbs/1000 Gals. of Water |
| --- |
| 1500 |
| 500 |
| 1500 |
| 500 |
| 1000 |
| 1000 |
| 1500 |
| 500 |
| 500 |
| 500 |
| 1500 |
| 1000 |
| 500 |
| 500 |
| 1500 |
| 1500 |
| 500 |

UNITED STATES PATENT AND TRADEMARK OFFICE
CERTIFICATE OF CORRECTION

PATENT NO. : 4,336,145
DATED : June 22, 1982
INVENTOR(S) : BRISCOE, James E.

It is certified that error appears in the above-identified patent and that said Letters Patent are hereby corrected as shown below:

Table V, Column 1 should read:

Quantity of Hydroxypropyl Guar,
Lbs/1000 Gals. of Water 1500
1500
1500
 500
1000
1000
1500
 500
 500
 500
1500
1000
 500
 500
1500
1500
 500

Signed and Sealed this

Twenty-sixth Day of October 1982

[SEAL]

Attest:

GERALD J. MOSSINGHOFF

Attesting Officer

Commissioner of Patents and Trademarks